United States Patent
Gu et al.

(10) Patent No.: US 6,722,674 B2
(45) Date of Patent: Apr. 20, 2004

(54) SAFETY DRIVING EQUIPMENT FOR SCOOTER

(75) Inventors: Hong-Jiun Gu, Taipei (TW); Jar Chen Wang, 16320 Bloomfield Ave., Cerritos, CA (US) 90703

(73) Assignees: Hong Jiun Gu, Taipei (TW); Jar Chen Wang, Cerritos, CA (US)

( * ) Notice: Subject to any disclaimer, the term of this patent is extended or adjusted under 35 U.S.C. 154(b) by 205 days.

(21) Appl. No.: 09/909,399

(22) Filed: Jul. 18, 2001

(65) Prior Publication Data
US 2001/0052682 A1 Dec. 20, 2001

Related U.S. Application Data

(63) Continuation-in-part of application No. 09/755,159, filed on Jan. 8, 2001, now Pat. No. 6,431,566.

(51) Int. Cl.[7] .................................................. B62M 1/00
(52) U.S. Cl. .............................. 280/87.021; 280/87.01; 280/87.051
(58) Field of Search ........................ 280/218, 87.01, 280/87.021, 87.041, 87.042, 87.051, 47.11, 47.12; 297/5; D21/423; 296/177

(56) References Cited

U.S. PATENT DOCUMENTS

| | | | | |
|---|---|---|---|---|
| 1,510,585 A | * | 10/1924 | Cushing et al. | 280/87.021 |
| 1,519,208 A | * | 12/1924 | Lupton | 280/219 |
| 1,666,139 A | * | 4/1928 | Johnson | 280/62 |
| 2,007,447 A | * | 7/1935 | Johnson | 280/62 |
| 3,129,952 A | * | 4/1964 | Rivers | 280/87.051 |
| 3,282,598 A | * | 11/1966 | Goodwin | 280/11.208 |
| D213,511 S | * | 3/1969 | Moribe | D21/433 |
| 3,663,038 A | * | 5/1972 | Hendricks | 280/218 |
| 3,807,760 A | * | 4/1974 | Jordan | 280/218 |
| 3,863,950 A | * | 2/1975 | Jordan | 280/218 |
| 3,902,739 A | * | 9/1975 | Kimura | 280/249 |
| 4,199,165 A | * | 4/1980 | Spitzke | 280/87.042 |
| 4,323,258 A | * | 4/1982 | Culpeper | 280/7.12 |
| 4,560,022 A | * | 12/1985 | Kassai | 180/65.1 |
| 4,930,796 A | * | 6/1990 | Harrod | 280/87.021 |
| 5,118,122 A | * | 6/1992 | Ricart | 280/11.217 |
| 5,160,155 A | * | 11/1992 | Barachet | 280/87.042 |
| 5,316,328 A | * | 5/1994 | Bussinger | 280/304.1 |
| 5,347,681 A | * | 9/1994 | Wattron et al. | 16/30 |
| 5,566,956 A | * | 10/1996 | Wang | 280/7.14 |
| D448,430 S | * | 9/2001 | Wang | D21/433 |
| D453,538 S | * | 2/2002 | Tseng | D21/433 |
| 6,386,304 B1 | * | 5/2002 | Wang | 180/65.1 |
| 6,431,566 B1 | * | 8/2002 | Gu | 280/87.021 |
| 6,494,470 B2 | * | 12/2002 | Chang | 280/87.041 |
| 6,499,755 B2 | * | 12/2002 | Gu | 280/210 |
| 6,561,534 B2 | * | 5/2003 | Gu | 280/242.1 |

FOREIGN PATENT DOCUMENTS

GB 2371275 A * 7/2002 ............ B62K/9/00

\* cited by examiner

*Primary Examiner*—Brian L. Johnson
*Assistant Examiner*—Kelly E Campbell
(74) *Attorney, Agent, or Firm*—Raymond Y. Chan; David and Raymond Patent Group

(57) ABSTRACT

A safety driving equipment for a scooter, includes a twister member with a supporting arm at the end thereof opposite to the driving wheels. A universal safety wheel is mounted at the free end of the supporting arm and a transmission unit is extended to connect the twister member at a position between the safety wheel and the driving wheels. The safety wheel is capable of efficiently providing an increased safety area while the scooter in wobbling mainly to maintain the force center shifting within the safety area.

19 Claims, 7 Drawing Sheets

SAFETY DRIVING EQUIPMENT FOR SCOOTER

This is a continuation in part of application Ser. No. 09/755,159, filed Jan. 8, 2001, now U.S. Pat. No. 6,431,566.

BACKGROUND OF THE PRESENT INVENTION

1. Field of Invention

The invention herein relates to a safety driving equipment for a toddler's scooter, mainly to provide an auxiliary wheel, relative to the rear wheels of the scooter body, to the driving structure of a toy scooter to increase the safety area and regulating the location of the force center.

2. Description of Related Arts

As shown in FIG. 1, the side elevation isometric drawing of a conventional scooter structure comprises a scooter body 1, mounted with live left and right wheels 31, 32 at the rear side; in the front, one vertically disposed shaft level 11 with handbars 12 connected on the top and a driving triangular base 2 fastened at the bottom mounted with left and right rear driving wheels 21, 22; the rider straddled on the scooter body 1 turns the handbars 12 by hands to drive the triangular base 2 connected through the shaft level 11, thereby to move the left and the right driving wheels 21, 22 alternatively to achieve the function of wobbling movement in actuation.

Referring to FIGS. 2 and 3, as shown in the bird's eye view, the driving triangular base 2 centered by the shaft level 11 moves to the left or the right sides to enable the left and the right driving wheels 21, 22 to achieve the purpose of actuate approach alternatively; furthermore, as the force center W on the triangular base swings in a gear arc, the force center W will define a safety area A, usually at one of the auxiliary wheel on the driving triangular base and relative to the left rear wheel 31 or the right rear wheel 32; if the force center W locates within the safety area A, the scooter body will not flip over; while moving in a fast speed, the handbars 12 operated by hands will generate a reaction force which will make the force center W to receive a pulling force and shift its position; if the reaction force exceeds a certain degree (while the handbars are forcefully operated) and accelerates by the inertia force generated from the mass of the human body in a fast proceeding speed, the force center W will easily move beyond the safety area A and causes the danger of having the scooter body tumble forward and oblique; just as shown in the Figures, while moving the scooter by operating the shaft level 11 through the handbars 12, the triangular base 2 will deviate to right or left due to the generated reaction force and adding in the proceeding inertia of driving, the force center W will usually exceed the congruent sides of the triangular safety base; therefore, scooters similar to this kind tend to flip over.

Moreover, since the left and the right driving wheels 21, 22 are located close to a mid-portion of the scooter body 1, a head portion of the scooter body 1 is suspended with respect to the ground. Therefore, the scooter will easily be flipped over from the front especially when external force is exerted on the front portion of the scooter body 1 such as hitting to a curb or crossing a bump. Besides, when the rider sits close to a rear portion of the scooter body 1, which is also suspended with respect to the ground, the scooter will be flipped over from the back easily.

It is unreasonable to let a young child in a risky or unsafe situation. However, we have to tolerate the above mentioned suffering drawbacks until an improved scooter that can provide an absolutely safe for the rider to play with the scooter is developed.

SUMMARY OF THE PRESENT INVENTION

A main object of the present invention is to provide a safety driving equipment for scooter, which can provide an absolutely safe scooter structure for a rider to avoid any unwanted flipping manner of the scooter.

Another object of the present invention is to provide a safety driving equipment for scooter, which comprises a safety wheel rotatably extended from a driving mechanism for supporting a front portion of the scooter body, so as to prevent the scooter body being flipped over from the front thereof.

Another object of the present invention is to provide a safety driving equipment for scooter, which comprises an anti-flip member affixed to a rear portion of the scooter body for reducing a vertical clearance between the rear portion of the scooter and the rear wheels, so as to avoid the scooter being flipped over from the back thereof.

Another object of the present invention is to provide a safety driving equipment for scooter, wherein the two rear wheels are further extended far apart from the scooter body for increasing the safety area of the scooter, so as to prevent the scooter being flipped over from the sides thereof.

Another object of the present invention is to provide a safety driving equipment for scooter, wherein no expensive or complicate mechanical structure is required to employ in the present invention in order to achieve the above mentioned objects. Therefore, the present invention successfully provides an economic and efficient solution for preventing the scooter being flipped over easily.

Specifically, the invention herein is consisted of an extended arm at the end relative to the driving wheels of the driving wheels of the driving mechanism; and a safety wheel capable of making universal rolling mounted lively at the end of the wheel arm. The driving mechanism is driven by a steering wheel through a transmission unit. Therefore, by moving around based on the transmission unit as the center and utilizing the relationship of the safety wheel relative to the rear wheels of the scooter body to increase the possibility of locating the force center in the regulated safety area.

To enable a further understanding of the objectives, the technological methods and the efficiency of the invention herein, the brief description of the drawings below is followed by detail description of the preferred embodiment.

DETAILED DESCRIPTION OF THE PREFERRED EMBODIMENT

Figure 1:
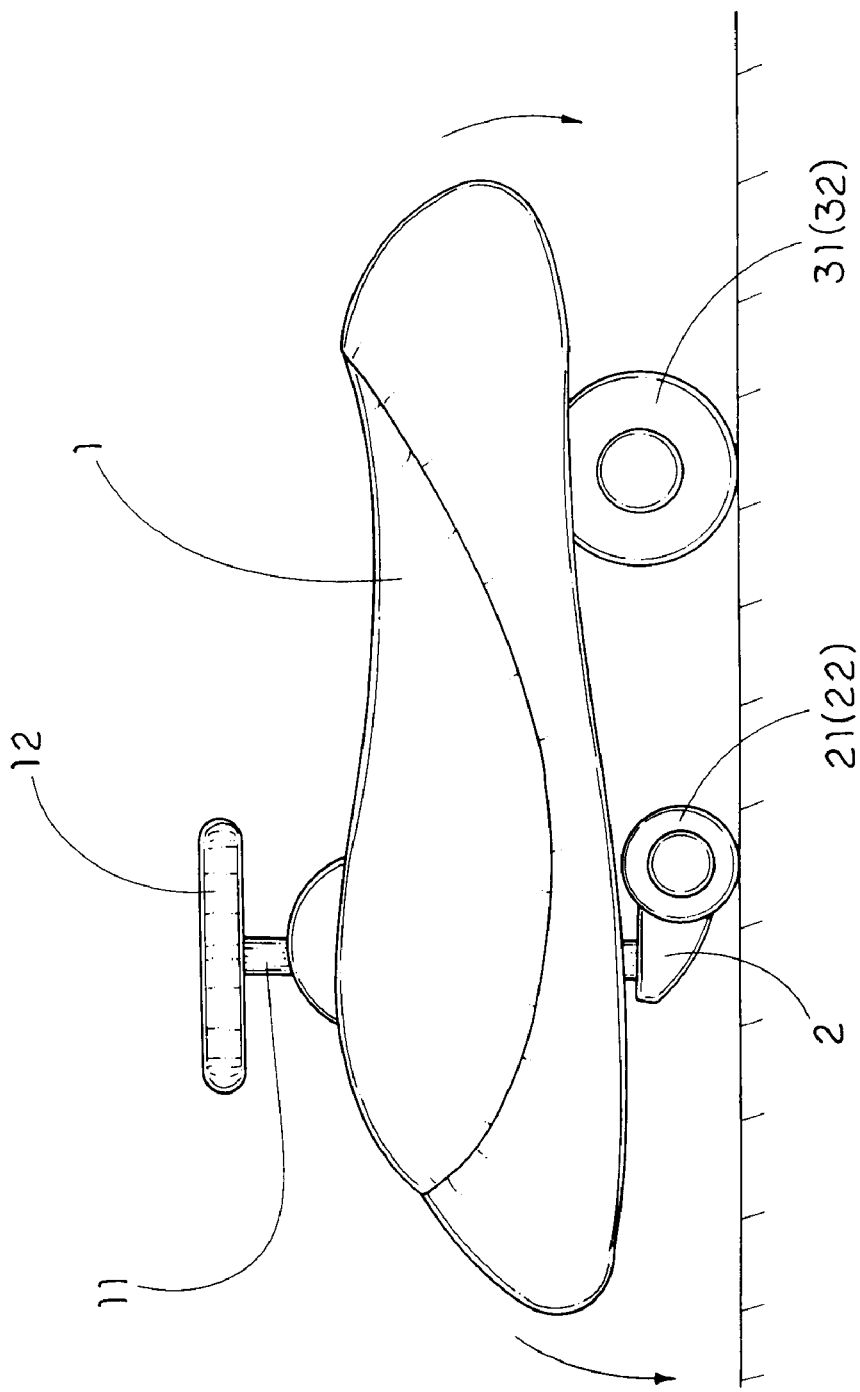
FIG. 1 is a side elevation drawing of a conventional scooter.

Referring to FIGS. 4 through 7 of the drawings, a scooter incorporated with a safety equipment according to a first preferred embodiment of the present invention is illustrated. The scooter, such as a conventional scooter, comprises a scooter body 1, a pair of rear wheels 31, 32 rotatably supported at a rear portion of the scooter body 1.

The scooter further comprises a transmission unit 11 having an upper control portion positioned above the scooter body 1 and a lower connecting portion extended underneath the scooter body 1, a steering means 12 affixed to the control portion of the transmission unit 11 for driving the connecting portion thereof to rotate in clockwise and anti-clockwise directions, a twister member 2 having a driven portion connected to the connecting portion of the transmission unit 11, and a pair of driving wheels 21, 22 spacedly and rotatably mounted to the twister member 2 wherein the two driving wheels 21, 22 are spaced apart from the driven portion of the twister member 2. Therefore, in order to drive the scooter, a rotating force must be applied on the steering means 12 to drive the twister to rotate in a clockwise and anti-clockwise manner.

The safety driving equipment comprises a supporting arm 23 frontwardly extended from the driven portion of the twister member 2 and a safety wheel 24 rotatably connected to a free end of the supporting arm 23 for supporting a front portion of the scooter body 1, so as to prevent the scooter from being flip over from the front thereof.

According to the preferred embodiment, the scooter body 1 has a receiving cavity wherein the two rear wheels 31, 32 are received therein via a wheel axle. In other words, the two rear wheels 31, 32 are operated within the receiving cavity of the scooter body 1.

Figure 4:
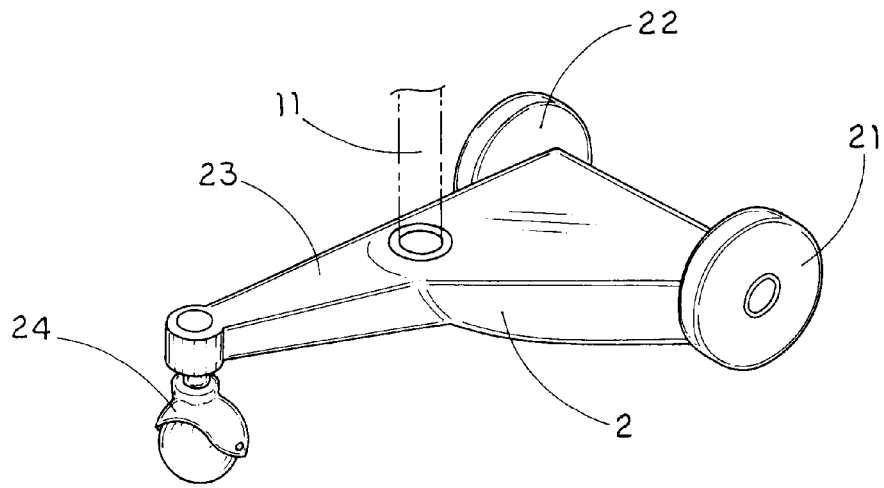
FIG. 4 is a perspective view of a driving mechanism of a safety driving equipment for a scooter according to a first preferred embodiment of the present invention.
Figure 5:
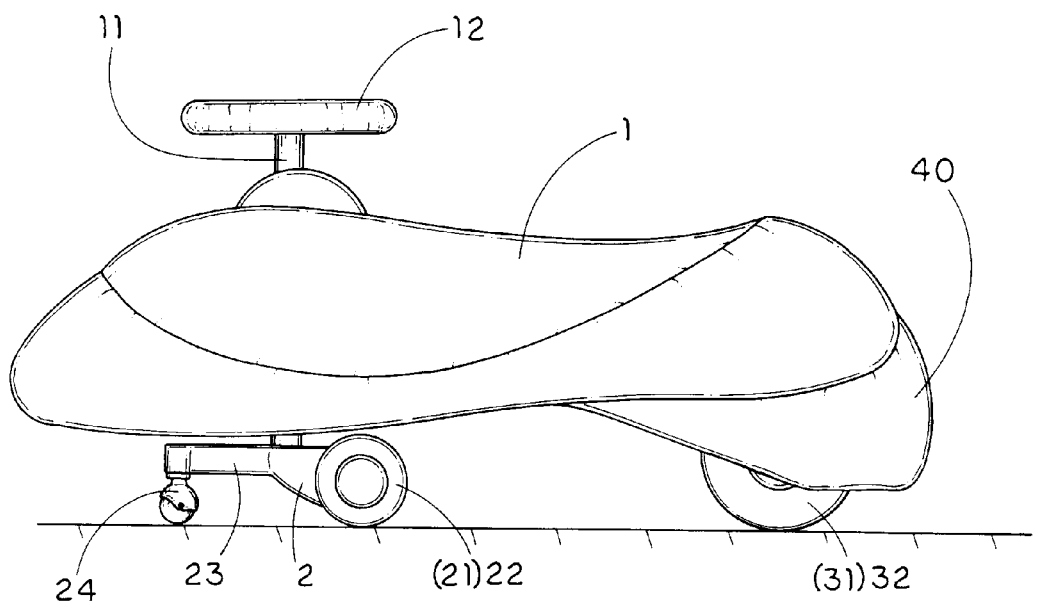
FIG. 5 is a side view of the scooter incorporated with the safety driving equipment according to the above first preferred embodiment of the present invention.

Referring to FIG. 4, to prevent the problem of having the tendency to flip over of the conventional scooter, the supporting arm 23 is extended from the twist base 2. The safety wheel 24 is capable of making universal rolling mounted at the end of the supporting arm 23 and relative to the center forward position of the driving wheels 21, 22. Therefore, while the steering means 12 is operated to drive, through the center point defined by the transmission unit 11, as shown in FIG. 5, to make the twister member 2 to swing right and left, and also through the transmission unit 11 to gear the driving wheels 21, 22 to proceed actuately to left or right.

According to the preferred embodiment, the steering means 12 comprises at least a hand bar which functions as a steering wheel for a rider to drive the twister member 2 to rotate wherein the steering means 12 is capable of not only moving the scooter forwardly or backwardly but also directing the course of the scooter.

The transmission unit 11 is a shaft having a top end which is the driving portion of the transmission unit 11 connected to the steering means 12 and a bottom end which is the connecting portion of the transmission unit 11 connected to the twister member 2 wherein the transmission unit 11 is rotatably penetrated through the scooter body 1 in such a manner that the steering means 12 is arranged to drive the twister member 2 to rotate when a rotating force is applied on the steering means 12.

As shown in FIG. 4, the twister member 2 having a triangularly shaped, preferred isosceles triangularly shaped, has a front end portion which is the driven portion and two rear side portions rotatably affixed the two driving wheels 21, 22 thereto respectively. In other words, the two driving wheels 21, 22 have the same distance from the driven portion of the twister member 2. Therefore, due to the movement of the two driving wheels 21, 22 with respect to the driven portion of the twister member 2, the scooter is adapted for moving forwardly and backwardly. It is worth to mention that for moving the scooter forward, the driven portion of the twister member 2 is positioned in front of the two driving wheels 21, 22, and for moving the scooter backward, the driven portion of the twist member 2 is positioned behind the two driving wheels 21, 22.

Accordingly, the supporting arm 23 is integrally extended from the twister member 2 at the driven portion thereof and has a free end for rotatably connecting to the safety wheel 24.

The safety wheel 24, which is a free rotating wheel, comprises a vertical axle affixed to the supporting arm 23 and a wheel casing rotatably attached to a bottom end of the vertical axle and rotatably received a ball shaped rotating wheel in the wheel casing such that the safety wheel 24 is adapted to self-rotating 360 degrees with respect to the free end of the supporting arm 23. Therefore, when the twister member 2 is driven to rotate, the safety wheel 24 is capable of rotating with respect to the twister member 2, so as to prevent the safety wheel 24 being stunk when operating the scooter. The wheel casing further comprises a ball bearing encirclingly mounted thereto for enhancing the rotating wheel in a free rotating manner. Since the safety wheel 24 is frontwardly extended from the twist member 2 for supporting a front portion of the scooter body 1, the scooter will not be flipped over from the front thereof.

As shown in FIG. 5, the scooter further comprises an anti-flip member 40 integrally extended from a bottom side of the rear portion of the scooter body 1 for reducing a vertical clearance between the scooter body 1 and the rear wheels 31, 32. As it is mentioned in the background, the rear portion of the scooter body 1 is suspended with respect to the ground, which may cause the scooter flipped over. Therefore, the anti-flip member 40 can reduce the distance between the scooter body 1 and the ground so as to prevent the scooter from being flipped over from the back thereof.

Figure 2:
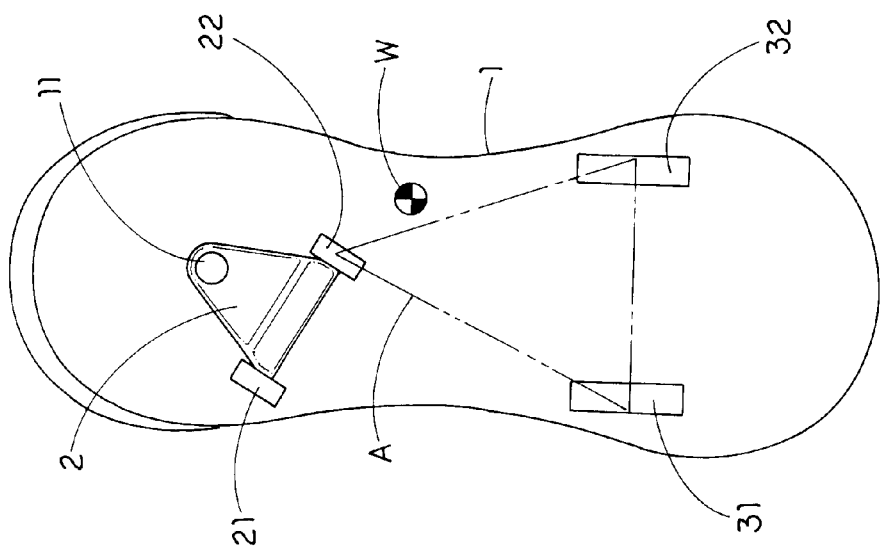
FIG. 2 is an isometric drawing of the deviated force center on the conventional scooter in wobbling.
Figure 3:
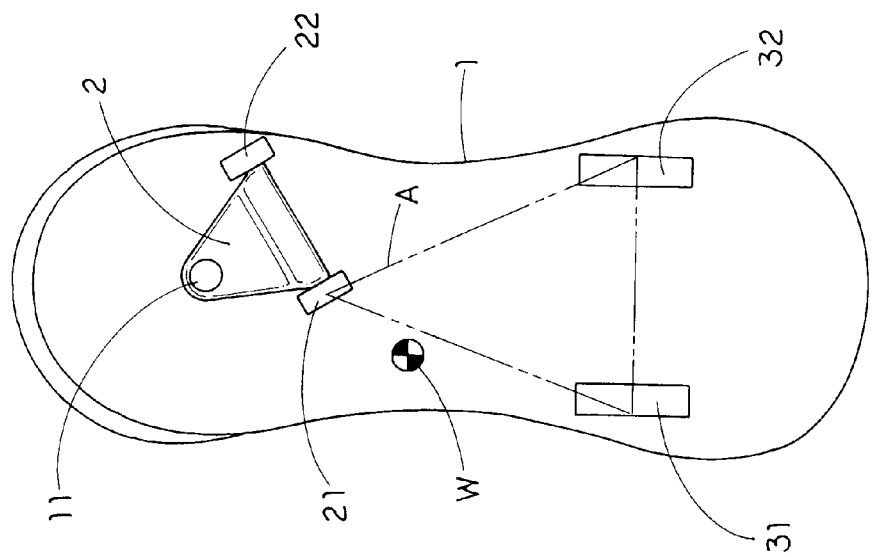
FIG. 3 is a second isometric drawing of the deviated force center on the conventional scooter in wobbling.
Figure 6A:
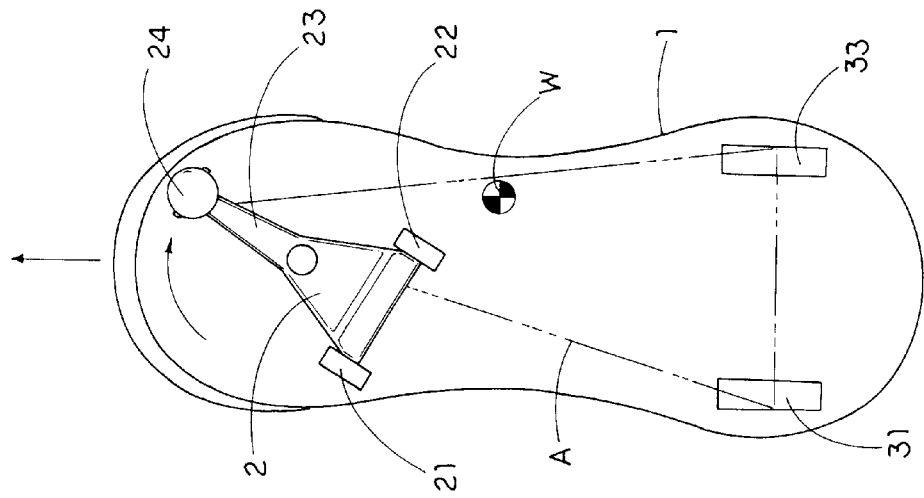
FIG. 6A is a bottom view of the scooter incorporated with the safety driving equipment according to the above first preferred embodiment of the present invention, illustrating the driving mechanism being turned in one direction.
Figure 6B:
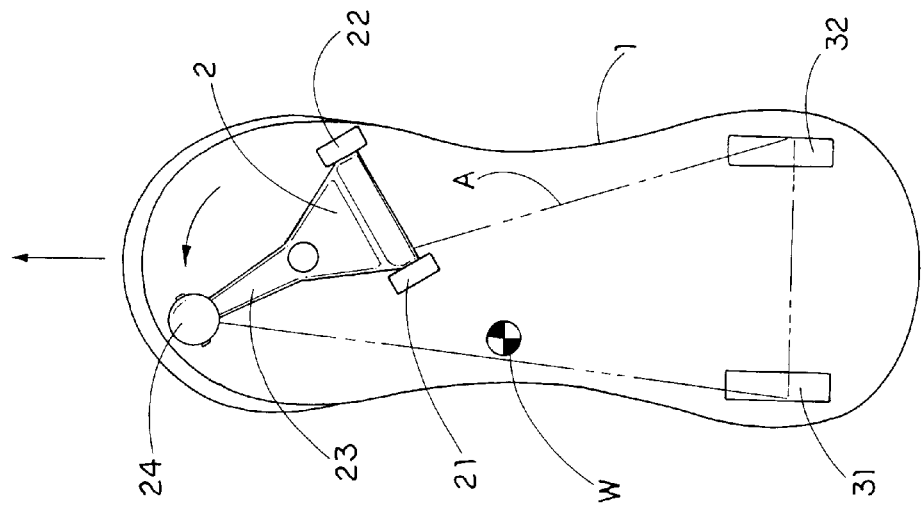
FIG. 6B is a bottom view of the scooter incorporated with the safety driving equipment according to the above first preferred embodiment of the present invention, illustrating the driving mechanism being turned in another direction.
Figure 7:
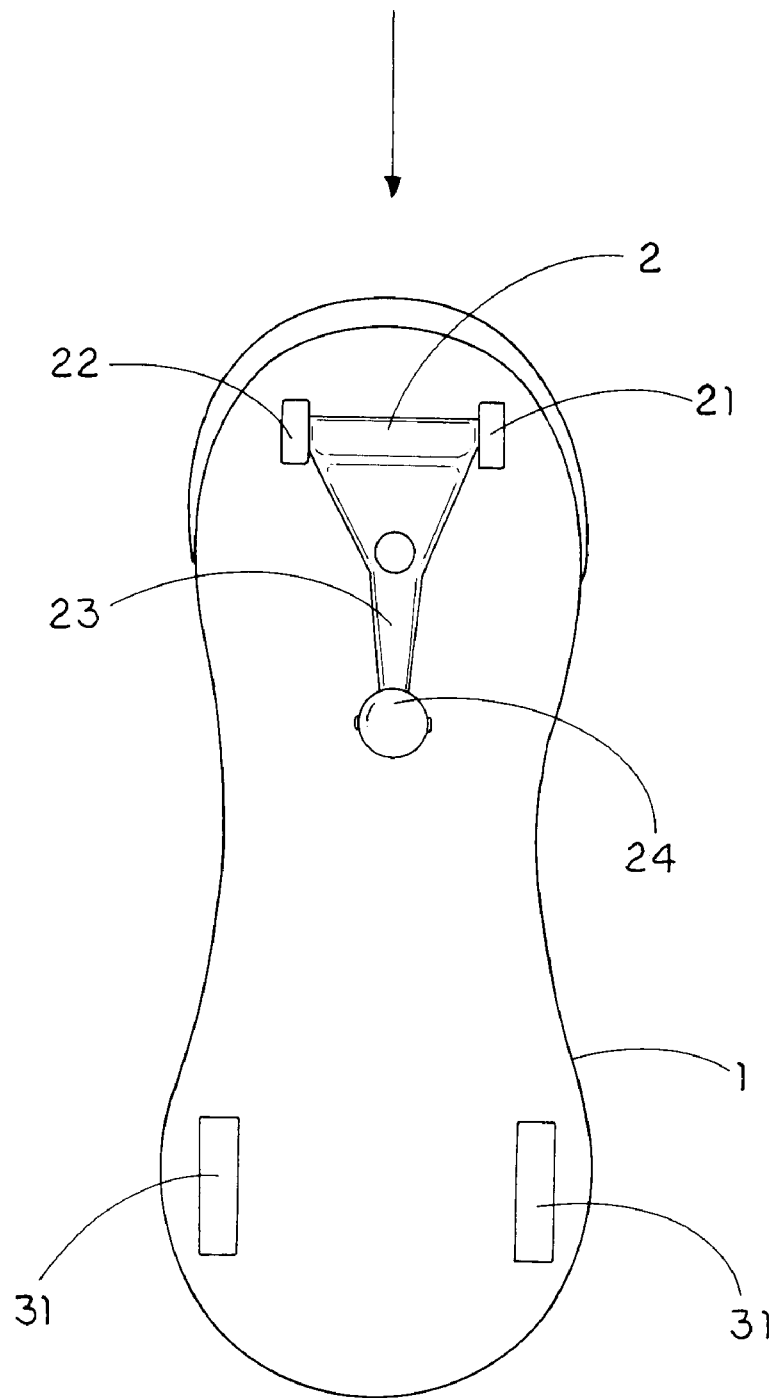
FIG. 7 is a bottom view of the scooter incorporated with the safety driving equipment according to the above first preferred embodiment of the present invention, illustrating the scooter being moved backward.

Referring to FIGS. 6A and 6B, since there is the safety wheel 24 mounted lively at the end of the back of the supporting arm 23 on the twister member 2, if the scooter body 1 makes more obvious bounce during the proceeding movement, the safety wheel 24 will allow the forward touching point fall directly on the safety wheel 24. Also, as shown in FIG. 6, if the gravity force of the whole scooter body 1 leaning forward falls on the safety 24, the safety wheel 24 relative to the two rear wheels 31, 32 mounted on the rear sides of the scooter body 1 will immediately define a larger triangular safety supporting area A, just as the force center W shown in FIGS. 2 and 3, (with the same movement, the deviating position will be the same), the force center W will be regulated within the larger safety area A, even when the steering means 24 is operated to deviate to the right, as shown in FIG. 7, the safety wheel 24 relative to the rear wheels 31, 32 will as well define a larger safety area A allowing the force center W to be regulated to shift within the safety area A. Therefore, protecting the scooter from the danger of flipping over, by means of the safety wheel 24 mounted at the end of the supporting arm 23 on the twister member 2 to efficiently enlarge the access to the safety area even if the force center deviates. Furthermore, the safety wheel 24 is a universal wheel, so either because of automatic movement, under force or wobbling operation, the safety wheel 24 will move along to any direction without encountering the obstacle caused by the angle of proceeding; basically, to have the safety wheel 24 with the height from the ground higher than that of the driving wheels 21, 22 and the safety wheel 24 cooperating in time with the rear wheels 31, 32 to form a larger safety area when the scooter body 1 bounces obviously during properly and efficiently achieves the safety purpose.

In order to drive the scooter forwardly, the driven portion of the twister member 2 must be positioned in front of the two driving wheels 21, 22, as shown in FIGS. 6A and 6B, in such a manner that when a clockwise rotating force and an anti-clockwise rotating force are subsequently applied on the steering means 12, the twister member 2 is driven to rotate in clockwise and anti-clockwise directions, so as to drive the scooter forward. When the driven portion of the two driving wheels 21, 22 are positioned in front of the twister member 2, as shown in FIG. 7, the scooter is driven to move backward by the above mentioned operation.

Furthermore, the length of the supporting arm 23 is better limited within the outer rim of the scooter body. If too long, the burden of operation the wobble will be affected; if too short, then there is no functional meaning. In fact, the length should be the diameter of the actute movement of the safety wheel 24 no longer than the wheel base between the two rear wheels 31, 32.

Figure 8:
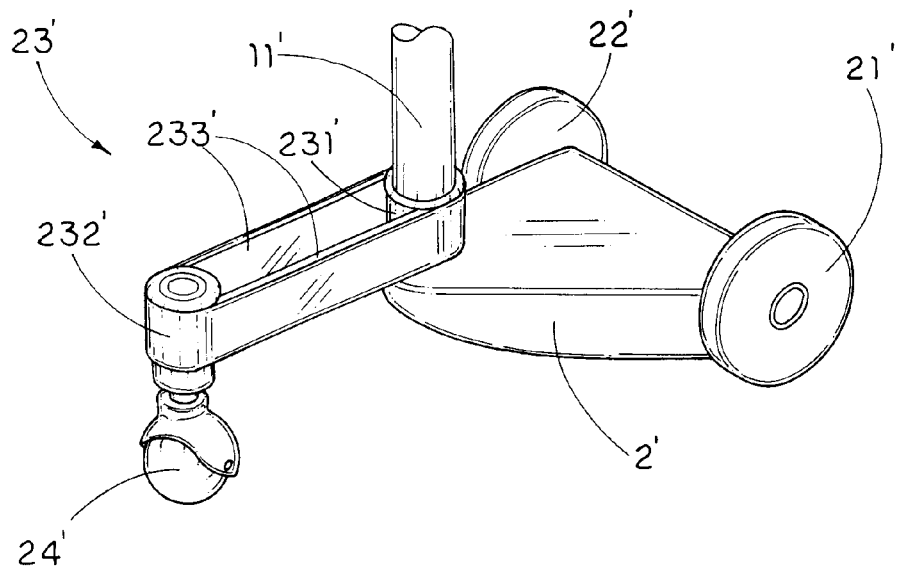
FIG. 8 is a perspective view of a driving mechanism of a safety driving equipment for a scooter according to a second preferred embodiment of the present invention.

Referring to FIG. 8 of the drawings, a second embodiment illustrates an alternative mode of the above first embodiment of the present invention. According to the second embodiment, supporting arm 23' is securely attached to the connecting portion of the transmission unit 11'. The supporting arm 23' comprises a tubular sleeve 231 ' for the connecting portion of the transmission unit 11 ' passing through, a connecting member 232' having a vertical slot for connecting the safety wheel 24', and a pair of parallel extending members 233' extended between the tubular sleeve 231' and the connecting member 232'.

Figure 9:
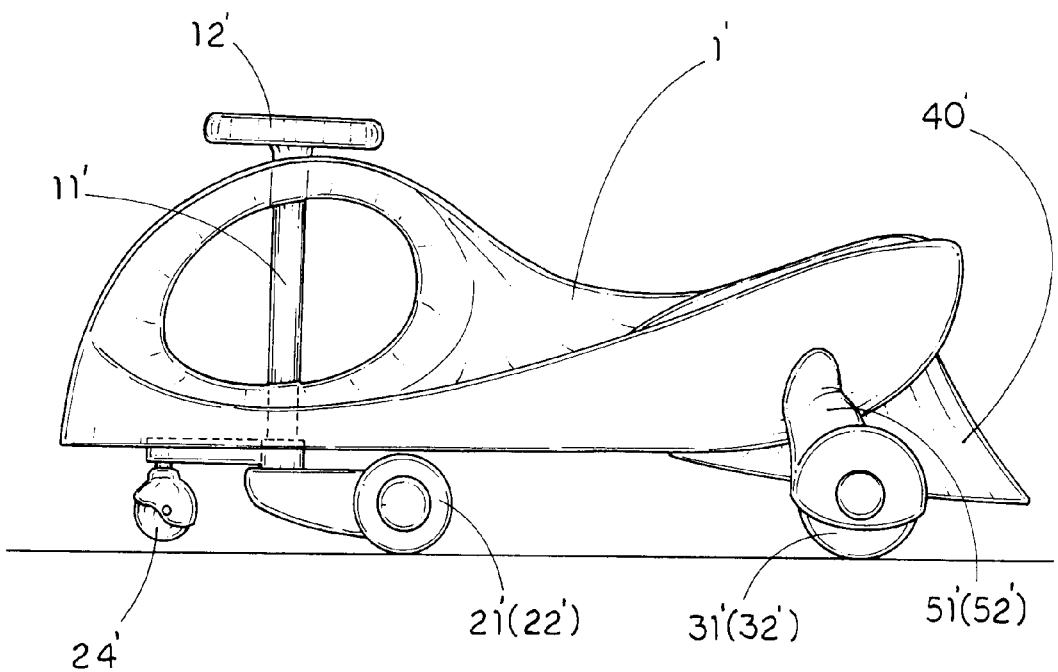
FIG. 9 is a side view of the scooter incorporated with the safety driving equipment according to the above second preferred embodiment of the present invention.

As shown in FIG. 9, the anti-flip member 40' having an arc shaped is affixed to the bottom side of the rear portion of the scooter body 1'. In other words, the anti-flip member 40' can be manufactured individually to attach to the conventional scooter so as to provide an anti-flip purpose for the scooter.

In order to reduce the size of the scooter, the scooter body 1' can be shaped slimly. However, the rear wheels 31, 32 are received in the receiving cavity of the scooter body 1 in the first embodiment. When reducing the width of the scooter body 1, the width of the rear wheels 31, 32 will be reduced as well, which may cause the scooter flipped over sidewardly.

Figure 10:
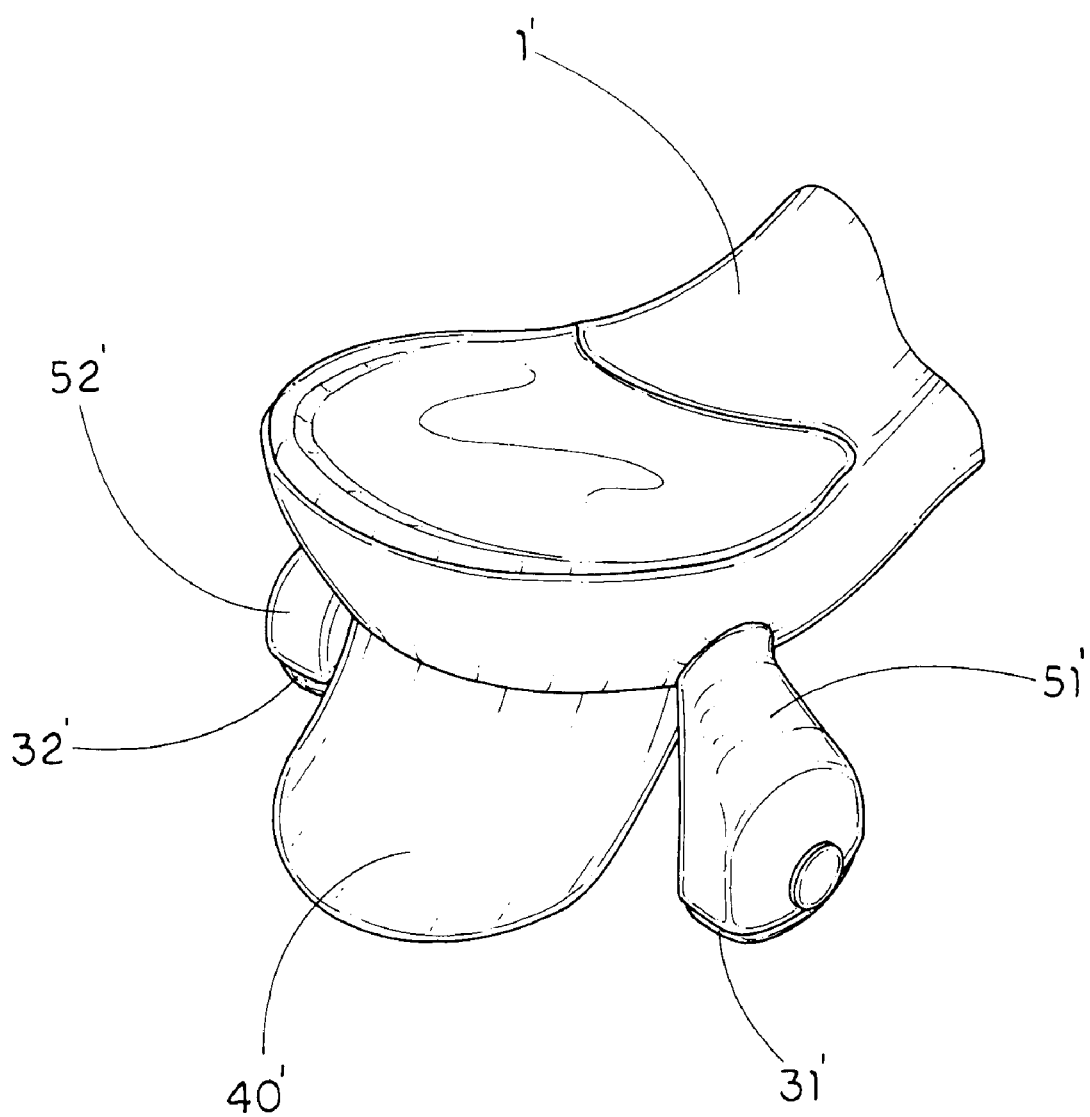
FIG. 10 is a perspective view of a rear wheel of the scooter incorporated with the safety driving equipment according to the above second preferred embodiment of the present invention.

In order to lengthen the distance between the two rear wheels 31', 32', the scooter body 1' further comprises a pair of wheel arms 51', 52' outwardly extended from two sides of the scooter body 1' for rotatably connecting the two rear wheels 31', 32' respectively. As shown in FIG. 10, each of the wheel arms 51', 52' has first end securely affixed to the respective side of the scooter body 1' and a second end having an elongated cavity for rotatably mounting the respective rear wheel 31', 32' via an axle. Therefore, the distance between the two rear wheels 31', 32' will be increased by the width of the scooter body 1' and lengths of the wheel arms 51', 52' for enhancing the stabilization of the scooter so as to prevent the scooter from being flipped over sidewardly.

Therefore, the invention herein provides a safety driving equipment for the scooter and meets new patent application requirements and is hereby lawfully submitted to the patent bureau for review and the granting of the commensurate patent rights.

What is claimed is:

1. A scooter, comprising:

a scooter body;

a pair of rear wheels rotatably supported at a rear portion of said scooter body;

a transmission unit having an upper control portion positioned above said scooter body and a lower connecting portion extended underneath said scooter body;

a steering means affixed to said control portion of said transmission unit for driving said connecting portion thereof to rotate in clockwise and anti-clockwise directions;

a twister member having a driven portion connected to said connecting portion of said transmission unit;

a pair of driving wheels spacedly and rotatably mounted to said twister member wherein said two driving wheels are spaced apart from said driven portion of said twister member; and a safety driving equipment, comprising:
a supporting arm frontwardly extended from said driven portion of said twister member; and
a safety wheel which is rotatably mounted to a free end of said supporting arm to support a front portion of said scooter body and prevent said scooter from being flipped over.

2. The scooter, as recited in claim 1, further comprising an anti-flip member integrally extended rearwardly and downwardly from a bottom side of said rear portion of said scooter body to reduce a vertical clearance between said scooter body and said rear wheels.

3. The scooter, as recited in claim 2, wherein said supporting arm is integrally extended from said twister member at said driven portion thereof and said safety wheel is adapted arranged to self-rotating 360 degrees with respect to said free end of said supporting arm and supported above around when said two driving wheels are running on ground.

4. The scooter, as recited in claim 3, wherein said scooter further comprises a pair of wheel arms outwardly extended from two sides of said scooter body for rotatably connecting said two rear wheels, wherein each of said wheel arms has first end securely affixed to said respective side of said scooter body and a second end having an elongated cavity for rotatably mounting said respective rear wheel via an axle.

5. The scooter, as recited in claim 4, wherein said twister member which has a triangular shape has a front end portion, which is said driven portion connected to said connecting portion of said transmission unit, and two rear side portions rotatably affixed said two driving wheels thereto.

6. The scooter, as recited in claim 4, wherein said transmission unit is a shaft having a top end which is said driving portion of said transmission unit connected to said steering means and a bottom end which is said connecting portion of said transmission unit connected to said twister member, wherein said transmission unit is rotatably penetrated through said scooter body.

7. The scooter, as recited in claim 1, further comprising an anti-flip member attached to a bottom side of said rear portion of said scooter body, wherein said anti-flip member is extended rearwardly and downwardly from said bottom side of said rear portion to reduce a vertical clearance between said scooter body and said rear wheels.

8. The scooter, as recited in claim 7, wherein said supporting arm is integrally extended from said twister member at said driven portion thereof and said safety wheel is arranged to self-rotating 360 degrees with respect to said free end of said supporting arm and supported above ground when said two driving wheels are running on ground.

9. The scooter, as recited in claim 8, wherein said scooter further comprises a pair of wheel arms outwardly extended from two sides of said scooter body for rotatably connecting said two rear wheels, wherein each of said wheel arms has first end securely affixed to said respective side of said scooter body and a second end having an elongated cavity for rotatably mounting said respective rear wheel via an axle.

10. The scooter, as recited in claim 9, wherein said twister member which has a triangular shape has a front end portion, which is said driven portion connected to said connecting portion of said transmission unit, and two rear side portions rotatably affixed said two driving wheels thereto.

11. The scooter, as recited in claim 9, wherein said transmission unit is a shaft having a top end which is said driving portion of said transmission unit connected to said steering means and a bottom end which is said connecting portion of said transmission unit connected to said twister member, wherein said transmission unit is rotatably penetrated through said scooter body.

12. The scooter, as recited in claim 1, wherein said supporting arm is integrally extended from said twister member at said driven portion thereof and said safety wheel is arranged to self-rotating 360 degrees with respect to said free end of said supporting arm and supported above around when said two driving wheels are running on ground.

13. The scooter, as recited in claim 1, wherein said scooter further comprises a pair of wheel arms outwardly extended from two sides of said scooter body for rotatably connecting said two rear wheels, wherein each of said wheel arms has first end securely affixed to said respective side of said scooter body and a second end having an elongated cavity for rotatably mounting said respective rear wheel via an axle.

14. The scooter, comprising:
a scooter body;
a pair of rear wheels rotatably supported at a rear portion of said scooter body for running on ground;
a transmission unit having an upper control portion positioned above said scooter body and a lower connecting portion extended underneath said scooter body;
a steering means affixed to said control portion of said transmission unit for driving said connecting portion thereof to rotate in clockwise and anti-clockwise directions;
a twister member having a driven portion connected to said connecting portion of said transmission unit;
a pair of driving wheels spacedly and rotatably mounted to said twister member wherein said two driving wheels are spaced apart from said driven portion of said twister member; and
an anti-flip member integrally extended rearwardly and downwardly from a bottom side of a rear portion of said scooter body to define a rear distance between said anti-flip member and the ground and said rear distance is shorter than a vertical clearance between said scooter body and the ground.

15. The scooter, as recited in claim 14, wherein said scooter further comprises a pair of wheel arms outwardly extended from two sides of said scooter body for rotatably connecting said two rear wheels, wherein each of said wheel arms has first end securely affixed to said respective side of said scooter body and a second end having an elongated cavity for rotatably mounting said respective rear wheel via an axle.

16. The scooter, as recited in claim 15, said anti-flip member is securely attached to said bottom side of said rear portion of said scooter body.

17. The scooter, as recited in claim 15, wherein said supporting arm is integrally extended from said twister member at said driven portion thereof and said safety wheel is adapted to self-rotating 360 degrees with respect to said free end of said supporting arm.

18. The scooter, as recited in claim 15, wherein said twister member which has a triangular shape has a front end portion, which is said driven portion connected to said connecting portion of said transmission unit, and two rear side portions rotatably affixed said two driving wheels thereto.

19. The scooter, as recited in claim 18, wherein said transmission unit is a shaft having a top end which is said driving portion of said transmission unit connected to said steering means and a bottom end which is said connecting portion of said transmission unit connected to said twister member, wherein said transmission unit is rotatably penetrated through said scooter body.

\* \* \* \* \*

(12) INTER PARTES REEXAMINATION CERTIFICATE (546th)
United States Patent
Gu et al.

(10) Number: US 6,722,674 C1
(45) Certificate Issued: Feb. 27, 2013

(54) SAFETY DRIVING EQUIPMENT FOR SCOOTER

(75) Inventors: Hong-Jiun Gu, Taipei (TW); Jar Chen Wang, Cerritos, CA (US)

(73) Assignees: Hong-Jiun Gu, Taipei (TW); Jar Chen Wang, Cerritos, CA (US)

Reexamination Request:
No. 95/000,355, Mar. 6, 2008

Reexamination Certificate for:
Patent No.: 6,722,674
Issued: Apr. 20, 2004
Appl. No.: 09/909,399
Filed: Jul. 18, 2001

Related U.S. Application Data

(63) Continuation-in-part of application No. 09/755,159, filed on Jan. 8, 2001, now Pat. No. 6,431,566.

(51) Int. Cl.
*B62M 1/00* (2010.01)

(52) U.S. Cl. ............ 280/87.021; 280/87.01; 280/87.051

(58) Field of Classification Search ........................ None
See application file for complete search history.

(56) References Cited

To view the complete listing of prior art documents cited during the proceeding for Reexamination Control Number 95/000,355, please refer to the USPTO's public Patent Application Information Retrieval (PAIR) system under the Display References tab.

*Primary Examiner* — Joseph A. Kaufman

(57) ABSTRACT

A safety driving equipment for a scooter, includes a twister member with a supporting arm at the end thereof opposite to the driving wheels. A universal safety wheel is mounted at the free end of the supporting arm and a transmission unit is extended to connect the twister member at a position between the safety wheel and the driving wheels. The safety wheel is capable of efficiently providing an increased safety area while the scooter in wobbling mainly to maintain the force center shifting within the safety area.

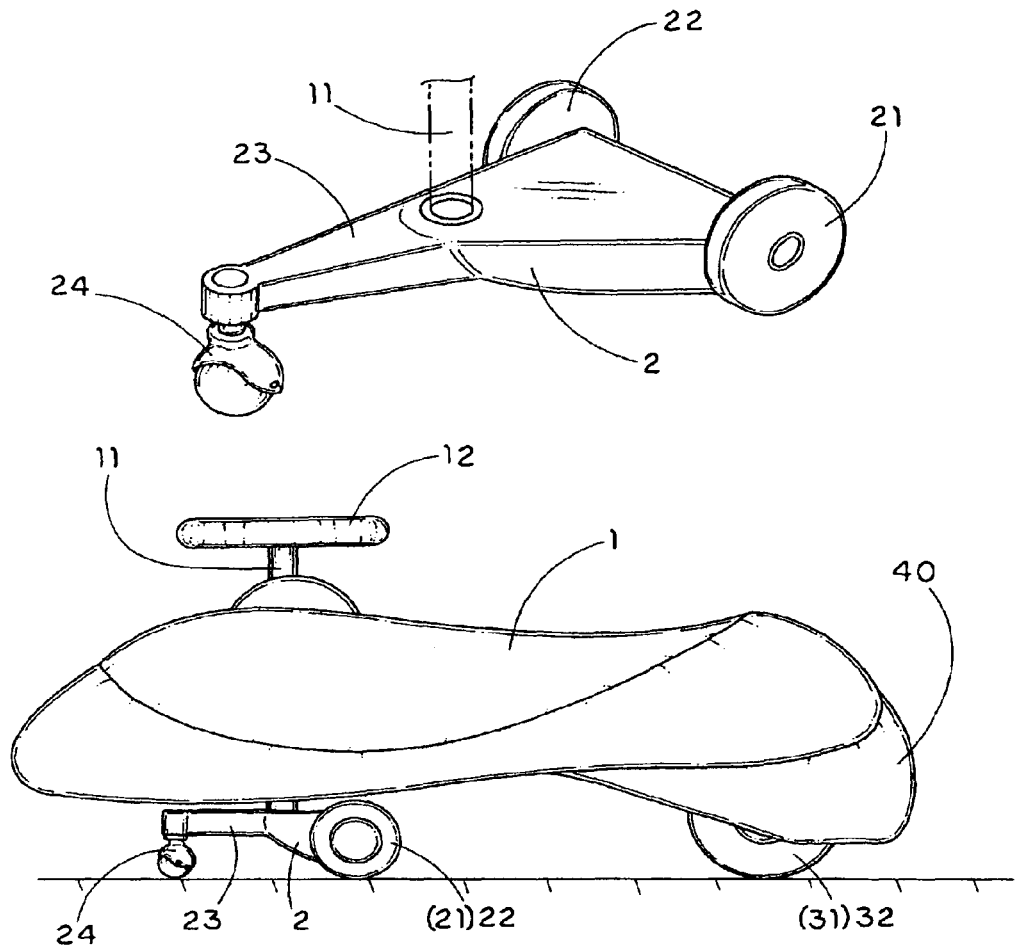

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claim 1 is cancelled.

Claims 2-19 were not reexamined.

\* \* \* \* \*